I. W. FOLTZ.
DRILL.
APPLICATION FILED MAY 26, 1915.
1,176,950.
Patented Mar. 28, 1916.
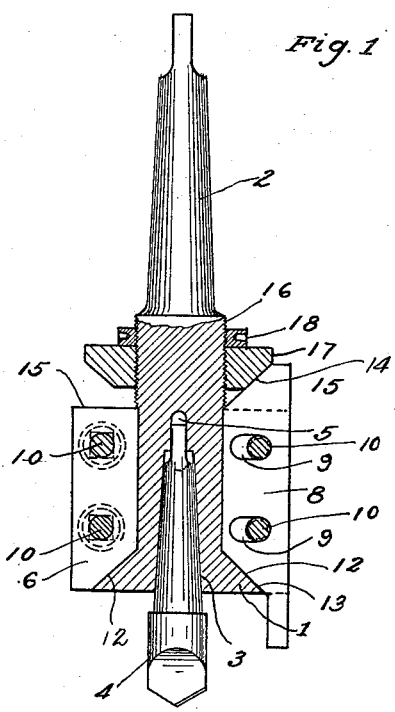
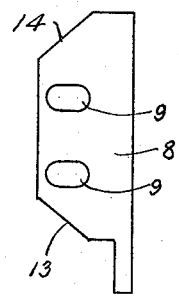
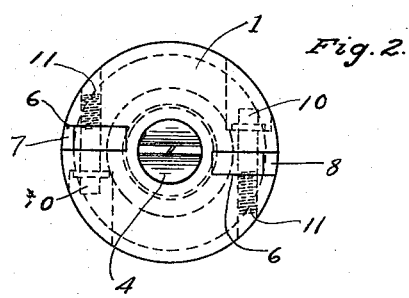
Witness:
Walter J. Stone.
Inventor,
Ira W. Foltz,
By Rummler & Rummler,
Attys.
THE COLUMBIA PLANOGRAPH CO., WASHINGTON, D. C.

UNITED STATES PATENT OFFICE.

IRA W. FOLTZ, OF CHICAGO, ILLINOIS.

DRILL.

1,176,950.   Specification of Letters Patent.   Patented Mar. 28, 1916.

Application filed May 26, 1915. Serial No. 30,526.

*To all whom it may concern:*

Be it known that I, IRA WASHINGTON FOLTZ, a citizen of the United States of America, and a resident of Chicago, county of Cook, and State of Illinois, have invented certain new and useful Improvements in Drills, of which the following is a specification.

The main objects of this invention are to provide a drill for making large circular cuts and particularly adapted for operation by portable devices, such as pneumatically or electrically operated drill chucks; to provide a drill of this class which may successively drill holes through spaced plates such as occur in boiler constructions; and to provide a drill which is adjustable to make circular cuts of various sizes through spaced plates for the purpose of making alined holes in said plates without necessitating cutting more stock out of the plates than is required in making a narrow circular cut therein.

An illustrative embodiment of this invention is shown in the accompanying drawings, in which—

Figure 1 is a side elevation partly in central section of a drill constructed according to this invention. Fig. 2 is a plan view of the drill. Fig. 3 is a detail of one of the cutting knives.

The drill shown in the drawings is particularly designed for making holes of various diameters in spaced plates, such as occur in boiler constructions and ships, etc., wherein the drilling operation must be performed after the plates operated upon are installed in such constructions. To bore these holes by an ordinary metal drill requires much time and labor if the drill is constructed to cut away all of the stock from the center to the circumference of the hole. Other drills have been provided which are arranged for making narrow circular cuts, thus obviating the necessity of cutting away all of the stock, and are also adjustable for cutting different sizes of holes. But such drills as a rule are so constructed that they cannot cut through a plurality of spaced plates, since the adjusting devices for the cutters extend beyond the outer cutting edges of the same. It is also necessary in a drill of this class to give good support to the cutters close to the cutting edges, to prevent frequent breakage thereof. The present drill is designed to meet the above mentioned requirements.

Referring to the drawings, the device consists of a cylindrical body or head 1 having an integral tapered shank 2 at its upper end for engagement with the chucks of electric or pneumatic drills, etc. At its lower end, the head 1 has a tapered hole 3 for receiving a centering or pilot drill 4. The upper end 5 of the hole 3 is suitably shaped for receiving the usual wedge or drift for removing the drill 4. The head 1 has slots 6 for receiving cutters 7 and 8. These cutters have horizontal slots 9 for receiving bolts 10 threaded into holes 11 in head 1. By means of these bolts, the stock of head 1 is squeezed against the sides of cutters 7 and 8, preventing lateral displacements thereof in the slots 6.

The bases or lower edges 12 of the slots 6 are inclined to coöperate with the inclined edges 13 of the blades 7 and 8 and the upper edges 14 of the cutters are also inclined. The upper inclined ends of the cutters extend above the upper surface 15 of head 1 and the shank 2 is threaded at its base 16 to receive a conical cutter adjusting nut 17 and a locking nut 18. Thus, to adjust the knives 7 and 8 to cut holes of different sizes, the bolts 10 are slightly loosened and the nut 17 is adjusted to force the cutters outwardly with respect to the head. When the desired adjustment is obtained, the bolts 10 are again tightened, clamping the cutters in their adjusted positions. Additional adjustment is afforded by varying the width of the cutters. Fig. 3 shows a cutter which is wider than the ones appearing in Figs. 1 and 2.

In the operation of the device, assuming that the tool is rotated by a chuck engaging the shank 2, the drill 4 will first drill a centering or pilot hole in the first plate of the series being operated upon. Then the cutters 7 and 8 will make narrow circular cuts of the desired size. If the tool is to successively drill holes in alinement in plates which are permanently installed and spaced apart, the drill may freely pass through the holes made thereby. Thus, it is possible to use very short knives or cutters 7 and 8, and much reduce the possibility of breakage that occurs in some devices of this class which employ comparatively long knives or cutters for doing the same class of work, since the heads of such devices, when they are adjustable to cut different sizes of holes, are of larger diameter than the distance between the outer edges of the cutters. By using a pilot drill of sufficient length, the pilot hole in the second plate may be bored while the head is revolving in the hole in the first plate, thus assuring perfect alinement without special care.

From the foregoing it may be seen that the invention provides a drill of the general class for making circular cuts, in which the cutters are adjustable laterally beyond the outer surface of the head or body of the drill.

Although but one specific embodiment of this invention has been herein shown and described, it will be understood that numerous details of the construction shown may be altered or omitted without departing from the spirit of this invention as defined by the following claim.

I claim:—

A device of the class described, comprising a head having a shank at one end, the opposite end of said head having a recess for receiving a drill shank, said head being provided with longitudinal slots therein, the base of said slots being inclined, cutters fitting within said slots, said cutters extending above said slots and having suitably inclined edges at their upper ends and at locations to engage the inclined bases of said slots, a conical nut threaded to said head and adapted to engage the inclined upper edges of said cutters, and means for securing said cutters against displacement in said slots.

Signed at Chicago this 24th day of May, 1915.

IRA W. FOLTZ.

Copies of this patent may be obtained for five cents each, by addressing the "Commissioner of Patents, Washington, D. C."